April 24, 1951 M. L. SMITH 2,550,304
GATE AND DISPLAY DEVICE
Filed Oct. 16, 1948
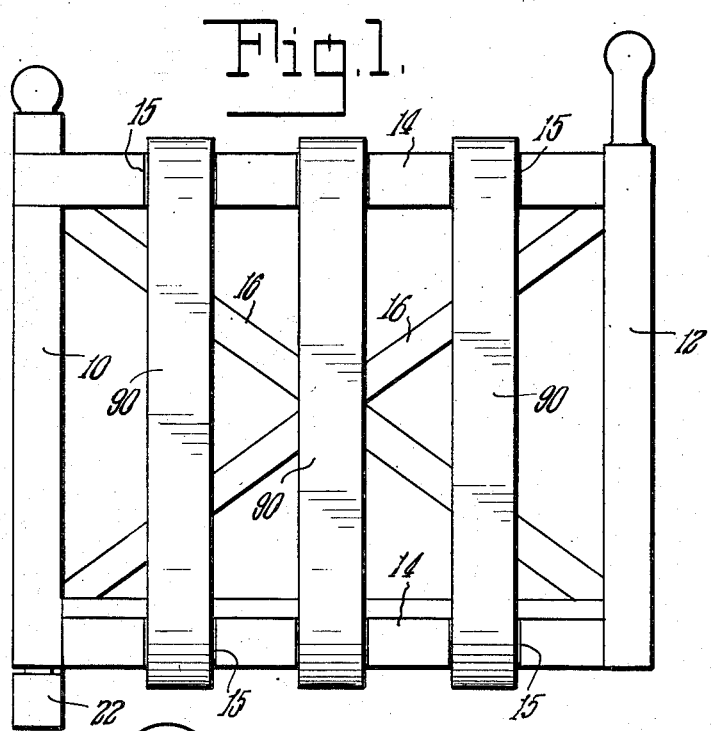
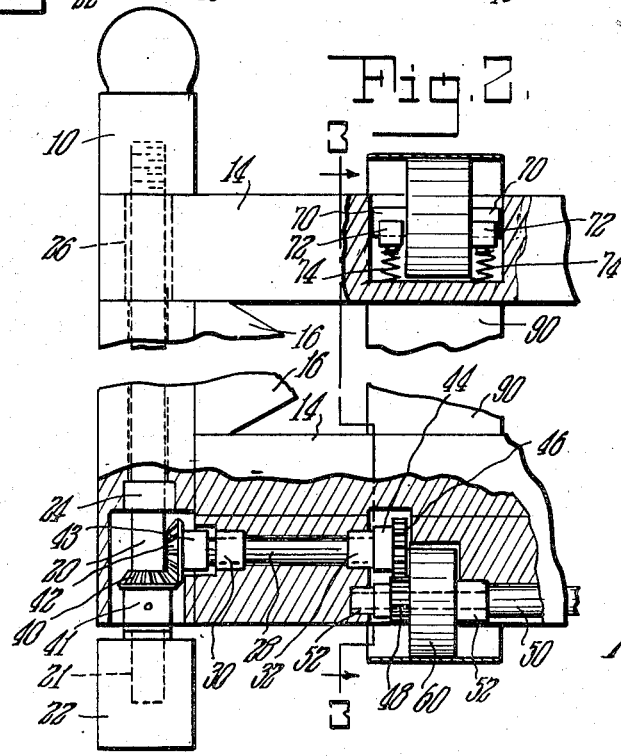
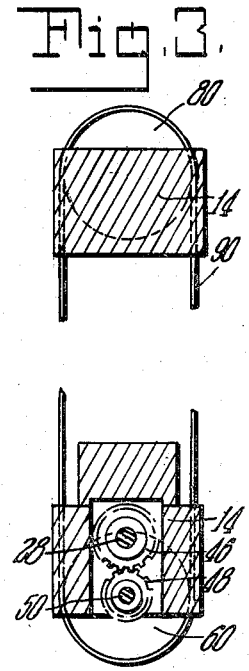
INVENTOR.
Martha L. Smith
BY Ross & Ross
Attys.

Patented Apr. 24, 1951

2,550,304

UNITED STATES PATENT OFFICE 2,550,304

GATE AND DISPLAY DEVICE

Martha L. Smith, Great Barrington, Mass.

Application October 16, 1948, Serial No. 54,860

1 Claim. (Cl. 40—60)

This invention relates to improvements in a gate and is directed more particularly to the provision of a mechanism incorporated with a gate whereby new and novel effects are obtained therewith.

The principal object of this invention is to provide a unique and improved swinging gate construction with which unusual results may be obtained.

To the above cited ends and with various other novel features of this invention as will become more readily apparent as the description thereof proceeds, my invention consists in certain novel features of construction and in a unique combination and arrangement of parts as will be hereinafter more particularly pointed out in the claim hereunto annexed and more fully described and referred to in connection with the accompanying drawings wherein:

Fig. 1 is a front elevational view of a gate embodying the novel features of my invention;

Fig. 2 is a broken sectional elevational view of a portion of the gate of my invention; and Fig. 3 is a cross sectional elevational view along the line 3—3 of Fig. 2.

Referring now to the different drawings more in detail, wherein but one embodiment of my invention is shown and in which similar reference characters refer to corresponding parts in all the figures, and referring more particularly to the preferred form of my invention selected for illustrative purposes (although it will be understood that changes and modifications may be made without departing from the spirit of the invention), I have shown a gate comprising an upright pivot post 10 and an upright outer post 12 held rigidly in spaced parallelism therewith by means of spaced cross members 14 and 14. If desired, angularly disposed intersecting members 16 and 16, substantially as shown in Fig. 1 and in a manner as is well known in the art, may likewise be provided to hold the members 10 and 12 in the desired spaced relation.

The post 10 is hollowed and has receivable therein, throughout a greater portion of its length, a stationary longitudinally disposed shaft 20, which shaft has an end portion 21 extending downwardly below the lower extremity of the member 10. The end portion 21 is receivable in a rigid support member 22 disposed beneath the member 10 and held in spaced relation therewith.

Bearings 24 and 26 facilitate swinging, turning or pivoting movements of the upright member 10 relative to the stationary shaft 20 and the rigid support member 22.

One or the other of the cross members 14 is hollowed so as to receive therewithin a drive shaft 28 which is rotatable in bearings 30 and 32 so as to permit rotating movements of the drive shaft 28 relative to the member 14 with which it is associated.

Bevel gears 40 and 42 are fixed to the members 20 and 28 respectively by means of hubs 41 and 43 as is shown in Fig. 2 so that as the gate is swung or pivoted, the post 10 rotates relative to the stationary shaft 20 and the member 42 is rotated relative to the member 40 whereby the member 28 is rotated.

A hub 44 and gear 46 is carried on the opposite end of the member 28. The gear 46 meshes with a gear 48 which is fixed to a driven shaft 50. The shaft 50 is seated in one or more bearings 52 supported by the member 14 and these facilitate the free rotation of the member 50.

One or more driving rollers 60 are fixedly mounted upon the driven shaft 50 so that as the member 50 is rotated the rollers 60 are likewise rotated.

The driving rollers 60 are arranged in spaced relation as to each other and any number can be used as desired.

Disposed in openings in the other of the cross members 14 are one or more trunnions 70 which are seated in saddles 72. The saddles are urged upwardly or in a direction away from the other of the cross members 14 by the action of spring members 74 as shown in Fig. 2. A driven roller 80 is fixedly mounted upon each trunnion 70.

There is a roller 80 provided on one of the cross members 14 for each roller 60 on the other of the cross members 14 and these rollers 60 and 80 being in parallelism with each other function in pairs as will shortly be observed.

An endless band 90, made of a thin sheet metal material or the like, is adapted to embrace each pair of rollers 60 and 80 and to be passed snugly thereover. The action of the springs 74 urges each roller 80 upwardly or away from the fixed roller 60 so as to insure against a loose fit of the endless band 90 thereover.

As the roller 60 is rotated by the driven shaft 50, the endless band 90 is likewise rotated and it rolls over the roller 80 as well, same being rotatable as explained.

Thus it will be observed that as the gate is swung open the endless bands are rotated and as the gate is closed the bands are rotated in the opposite direction.

Means is provided to hold the bands 90 from sidewise shifting. The cross members 14 are wider laterally than the over all dimension of the runs of the bands 90 and are grooved on their opposite sides at 15 so as to provide runways in which the bands may operate.

Various indicia may be imprinted upon the bands so that as the same are rotated various color effects or the like may be produced.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A gate construction comprising in combination, a support, an elongated stationary shaft extending upwardly vertically from said support, spaced vertically disposed pivot and outer posts connected together by upper and lower cross members forming a gate, said pivot post swingable on said shaft, drive shaft means in said lower cross member, driving connections between said stationary shaft and drive shaft means arranged whereby the latter is rotated as the gate is swung relative to said stationary shaft, drive rolls fixed in spaced relation on said drive shaft having peripheral portions extending below said lower cross rail, idler rolls above said drive rolls one for each drive roll rotatable relative to said upper cross member having peripheral portions disposed above said member, and endless bands around and in engagement with said drive and idler rolls whereby said bands are disposed in spaced relation between said pivot and outer posts.

MARTHA L. SMITH.

REFERENCES CITED

The following references are of record in the file of this patent:

UNITED STATES PATENTS

| Number | Name | Date |
| --- | --- | --- |
| 1,370,908 | O'Reilly | Mar. 8, 1921 |

FOREIGN PATENTS

| Number | Country | Date |
| --- | --- | --- |
| 18,680 | Netherlands | Jan. 15, 1929 |
| 53,156 | Switzerland | Sept. 14, 1910 |
| 307,020 | Italy | Apr. 8, 1933 |